United States Patent
Woodworth

[11] Patent Number: 5,923,428
[45] Date of Patent: *Jul. 13, 1999

[54] METHOD AND APPARATUS FOR MEASURING DIMENSIONS OF OBJECTS ON A CONVEYOR

[75] Inventor: Mark R. Woodworth, Oak Park, Ill.

[73] Assignee: PSC Inc., Webster, N.Y.

[ * ] Notice: This patent is subject to a terminal disclaimer.

[21] Appl. No.: 08/893,765

[22] Filed: Jul. 11, 1997

Related U.S. Application Data

[63] Continuation of application No. 08/507,625, Jul. 26, 1995, Pat. No. 5,699,161.

[51] Int. Cl.$^6$ ............................ G01B 11/24; G01B 11/04
[52] U.S. Cl. ...................... 356/375; 356/373; 364/478.03
[58] Field of Search .................... 356/378, 376, 356/385, 383, 384, 386, 387, 430, 431, 237, 373, 375, 380; 364/478; 414/21, 402, 434, 786; 250/221; 350/6.91, 6.8

[56] References Cited

U.S. PATENT DOCUMENTS

| | | |
|---|---|---|
| 3,436,968 | 4/1969 | Unger et al. . |
| 3,513,444 | 5/1970 | Henderson . |
| 3,588,480 | 6/1971 | Unger et al. . |
| 4,179,707 | 12/1979 | Sjodin et al. ............................ 348/142 |
| 4,226,536 | 10/1980 | Dreyfus et al. ......................... 356/376 |
| 4,286,880 | 9/1981 | Young ..................................... 414/786 |
| 4,773,029 | 9/1988 | Claesson et al. ....................... 364/562 |
| 4,905,512 | 3/1990 | Hayashi .................................... 73/169 |
| 5,105,392 | 4/1992 | Stringer et al. .......................... 367/99 |
| 5,220,536 | 6/1993 | Stringer et al. .......................... 367/99 |
| 5,331,118 | 7/1994 | Jenseen et al. ...................... 177/25.14 |
| 5,422,861 | 6/1995 | Stringer et al. .......................... 367/99 |
| 5,501,571 | 3/1996 | Van Durrett et al. . |

*Primary Examiner*—Frank G. Font
*Assistant Examiner*—Michael P. Stafira
*Attorney, Agent, or Firm*—Foley & Lardner

[57] ABSTRACT

A method and apparatus for measuring the length, width, and height of rectangular solid objects moving on a conveyor. The apparatus includes a light curtain, two laser triangulation range finders, and a pulse tachometer mounted on a frame around a conveyor. As an object is conveyed through the frame, measurements from each of the sensors are correlated by a digital computer to estimate the length, width and height of the object. The method and apparatus does not require a break in the surface of the conveyor, and is insensitive to object placement and orientation on the conveyor.

11 Claims, 16 Drawing Sheets

METHOD AND APPARATUS FOR MEASURING DIMENSIONS OF OBJECTS ON A CONVEYOR

This application is a continuation of application Ser. No. 08/507,625, filed Jul. 26, 1995 U.S. Pat. No. 5,699,161.

BACKGROUND OF THE INVENTION

1. Field of the Invention

The invention relates to a method and apparatus for measuring the size of objects on a moving conveyor. More specifically, the invention relates to a method and apparatus for measuring the size of objects on a conveyor using a photodiode light curtain to measure the height of the objects together with a two laser rangefinders which employ light detection cameras and pulse tachometers to measure the length and width of the objects on the conveyor.

2. Description of the Related Art

Objects traditionally have been measured by hand with ruled straight-edges and tape measures. However, in a conveyor environment, in which the objects on the conveyor are moving (i.e., excess of 100 objects per minute passing through a particular area on the conveyor), this is an unreasonable method for determining the size of the objects.

Unger et al. (U.S. Pat. No. 3,436,968 and U.S. Pat. No. 3,588,480) describes a dual light curtain system with one set of beams positioned horizontally with respect to the conveyor, and another set of beams positioned vertically with respect to the conveyor. Such an arrangement of a two-dimensional light curtain requires a break in the surface of the conveyor, due to the photodetectors on the bottom edge of the light curtain that interfere with the conveyor. The Unger system is undesirable due to the needed break in the surface of the conveyor, which is not always available in existing conveyor systems. Additionally, the Unger system requires carton orientation alignment prior to the measurement by the two-dimensional light curtain.

Henderson et al. (U.S. Pat. No. 3,513,444) describes a dual light curtain system which accumulates the sum of volume slices as the object is conveyed. This system can only measure the volume, and requires carton orientation alignment, as well as requiring a break in the surface of the conveyor.

Claesson et al. (U.S. Pat. No. 4,773,029) describes the use of two light curtains, one with horizontal beams and one with vertical beams, to measure objects on a conveyor. Like the above-mentioned system, the Claesson system also requires a break in the surface of the conveyor.

Hayashi et al. (U.S. Pat. No. 4,905,512) describes a method similar to the dual light curtain system of Claesson, except that in the place of an array of sensors, a single sensor is moved back and forth. The time required to move the sensor back and forth strongly limits the speed at which objects can be moved on the conveyor. This makes the Hayashi system inappropriate for high speed object measurements. The Hayashi system is appropriate for measuring long, continuous materials that change little in their respective lateral dimensions over time, such as extruded dough in a baking process.

Stringer et al. (U.S. Pat. No. 5,105,392) describes several measurement schemes, only one of which measures objects in motion. The in-motion scheme uses multiple ultrasonic sensors to sense the top, sides and back of an object when the front of the objects hits a cross-conveyor photo-eye. The use of ultrasonics carries with it some difficulties, such as the changes in the speed of sound due to temperature and air pressure, the relatively slow repetition rate due to the travel time of sound, and the large cone of solid angle sampled by the sensor, which makes it difficult to ascertain which part of an object is being measured. The Stringer system also requires that the object be orientationally aligned.

Stringer et al. (U.S. Pat. No. 5,220,536) describes a light curtain with vertical beams to obtain width information and ultrasonic sensors to get the height information. This approach suffers from the temperature and pressure sensitivity and repetition rate limitations of ultrasonics, as well as the vertical light beams requiring a break in the surface of the conveyor.

Jenseen et al. (U.S. Pat. No. 5,331,118) describes a system similar to the dual light curtain approaches described above, but utilizes barcode scanners and an array of barcodes in place of the light curtains. This approach suffers from the added complexity associated with the non-orthogonal geometry of the measuring scheme, as well as requiring a break in the surface of the conveyor.

Sjodin et al. (U.S. Pat. No. 4,179,707) describes a measuring system for substantially parallel objects on a conveyor using a light source, a background area for receiving light reflected of the objects, and a camera for receiving the light reflected off the background area. This system suffers from the need to have the objects substantially aligned prior to the measurement process, as well as requiring a background medium for the camera to properly receive the reflected light therefrom.

Dreyfus et al. (U.S. Pat. No. 4,226,536) describes a measuring system for helicopter rotor blades, using both a moving light transmitting source and a moving light receiving source. This system suffers from the need to perform advanced calculations related to the exact location of the two light sources with respect to time, as well as the need to maintain moving components in the system, which typically are more prone to failure than stationary components.

SUMMARY OF THE INVENTION

The present invention relates a system for measuring the size of an object on a conveyor. The system includes a first triangulation rangefinder on a first side of the conveyor perpendicular to the direction of travel of the conveyor. The first laser triangulation rangefinder is configured to shine a spot of light on one side of the object, and to detect the distance from the first laser triangulation rangefinder to where the spot of light impinges on the one side of the object. The system also includes a second laser triangulation rangefinder on a second side of the conveyor opposite the first side of the conveyor. The second laser triangulation rangefinder is configured to shine a spot of light on an other side of the object, and to detect the distance from the second laser triangulation rangefinder to where the spot of light impinges on the other side of the object. The system further includes a light curtain array disposed in a plane normal to the direction of travel of the object. The light curtain includes a plurality of light emitting elements and a plurality of light receiving elements respectively located on an opposite side of the conveyor. The light curtain is used to measure the height of the object as it passes through the light curtain array. The system also includes a linear travel measuring circuit configured to determine the distance traveled by the object as it travels on the conveyor. The system also includes a processor configured to receive output from each of the above elements, and to determine a length, width and height of the object accordingly.

The present invention also relates to a method for determining a size of an object on a conveyor, with the object having at least a first side and a second side and a height, with the first side being opposite with respect to the second side. The method includes the step of measuring the distance from a first rangefinder to a first spot of light incident on the first side of the object and the position of the object/conveyor, as indicated by the linear distance traveled. The method further includes the step of repeating the above two steps until the first spot of light is no longer incident on the first side of the object for at least a first amount of time. The method further includes the step of collecting an array of pairs of rangefinder distance and position from the above repeated steps. The method still further includes the step of identifying a first point in the array at which the first spot of light was initially incident on the first side of the object. The method also includes the step of identifying a second point in the array at which the first spot of light was last incident on the first side of the object. The method includes the step of identifying a third point in the array at which the first spot of light was incident on the first side of the object at a location closest to a lateral side of the conveyor. The method also includes the step of determining a slope of a first line connecting the first point to the third point, and a slope of a second line connecting the second point to the first point. Lastly, the method includes the step of determining the one side of the object to be elements in the array between the first point and the third point if the slope of the first line is greater than the slope of the second line, and determining the one side of the object to be elements in the array between the second point and the third point if the slope of the second line is greater than the slope of the first line.

BRIEF DESCRIPTION OF THE DRAWINGS

For a description of a method and apparatus according to the invention, reference is made to the following description and accompanying drawings, in which.

DETAILED DESCRIPTION OF THE PREFERRED EMBODIMENTS

Figure 1:
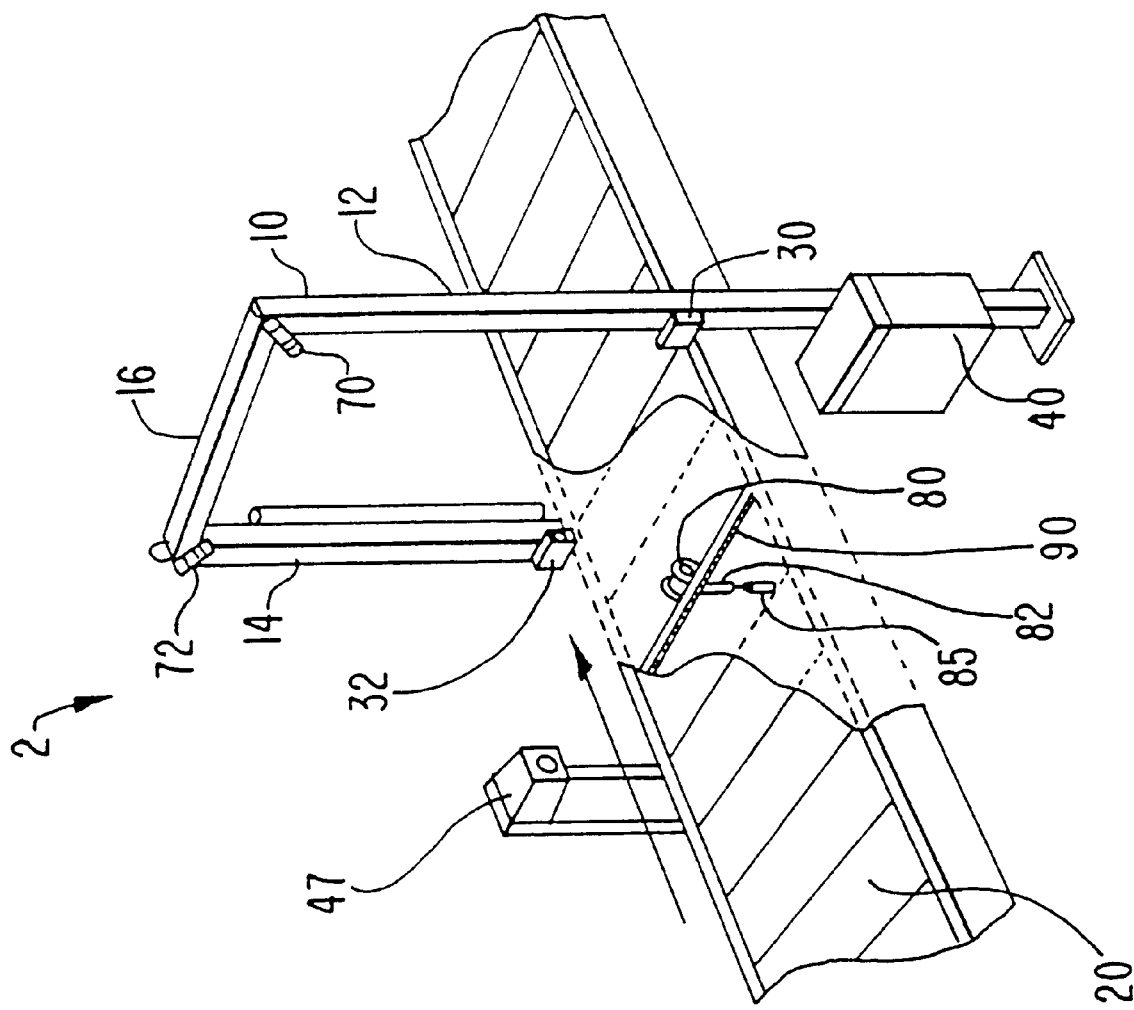
FIG. 1 illustrates the system according to the invention mounted on a conveyor.

A preferred embodiment of the invention will be described hereinbelow with reference to the drawings. The system according to the invention measures the length, width and height of objects, such as cartons, in motion, as they are transported on a conveyor. The system does not require a break in the surface of the conveyor, nor does it require alignment of the cartons prior to the measurement process. The system is able to handle measuring objects on very high speed conveyors with small gaps between the objects.

The system includes a digital computer which receives and correlates the signals received from four sensors mounted on and around the conveyor. These four sensors correspond to: 1) a first laser triangulation rangefinder on one side of the conveyor which measures the distance from the side of the conveyor to the side of the carton on the conveyor, 2) a second laser triangulation rangefinder on the other side of the conveyor, 3) a light curtain array with horizontal beams running across the conveyor in a plane perpendicular to the direction of travel of the objects on the conveyor, which measures the highest point on the carton passing through the plane, and 4) a pulse tachometer which measures the motion (or speed) of the conveyor, and consequently measures the motion of the objects in the direction of travel of the conveyor.

In the preferred embodiment, the triangulation sensors are mounted in a single plane perpendicular to the direction of travel of the objects on the conveyor. The light curtain sensors are mounted in a separate plane offset from that of the triangulation sensors. As an object passes through these "measuring planes", the digital computer collects three profiles: one for the top of the object, and one for each side of the conveyor. When the carton leaves the measuring plane of the triangulation sensors, the digital computer interprets the side profiles in a manner described hereinbelow, in order to locate the four edges of the object. From these located edges, the computer readily calculates the length and width of the object. The top profile is used to calculate the height of the object. From the height, length and width determinations, the volume of the object is determined by a multiplication of these three values. This calculation assumes that the objects are rectangular solids.

To prevent crosstalk, the laser frequency used in the triangulation measurements is different from that used in the light curtain; moreover, one or more sensors may have a filter element (not shown in the figures for clarity) for filtering out frequencies other that of its associated light source. Of course, if the respective measurement planes of the light curtain array and the triangulation rangefinders are sufficiently far away from each other, then the light curtain sensor and the triangulation rangefinders can each use the same frequency band without causing substantial interference to each other.

The system 2 according to the invention, as mounted around a conveyor 20, is shown in various angular views in FIGS. 1 through 7. In each of these figures, the system is mounted on a U-shaped frame 10 that traverses the width of the conveyor 20. A first laser light source 30 is mounted on one vertical bar 12 of the frame 10, and a second laser light source 32 is mounted on the other vertical bar 14 of the frame 10. A top bar 16 connects the two vertical risers 12, 14, and it is situated above the conveyor 20 in a substantially transverse relationship with respect to the conveyor 20, as seen in FIGS. 1 through 7. Mounted below the first laser light source 30 is the control electronics 40, in which is housed a digital computer (see FIG. 8) that computes the size of the objects 60 on the conveyor 20 based on raw measurement data fed to it. Of course, other mountings of the system 2 around a conveyor 20 may be envisioned by those of ordinary skill in the art, such as having a first and a second riser on respective sides of the conveyor in which the first and second triangulation rangefinders are respectively situated, and not having a top bar connecting the two risers.

Figure 2:
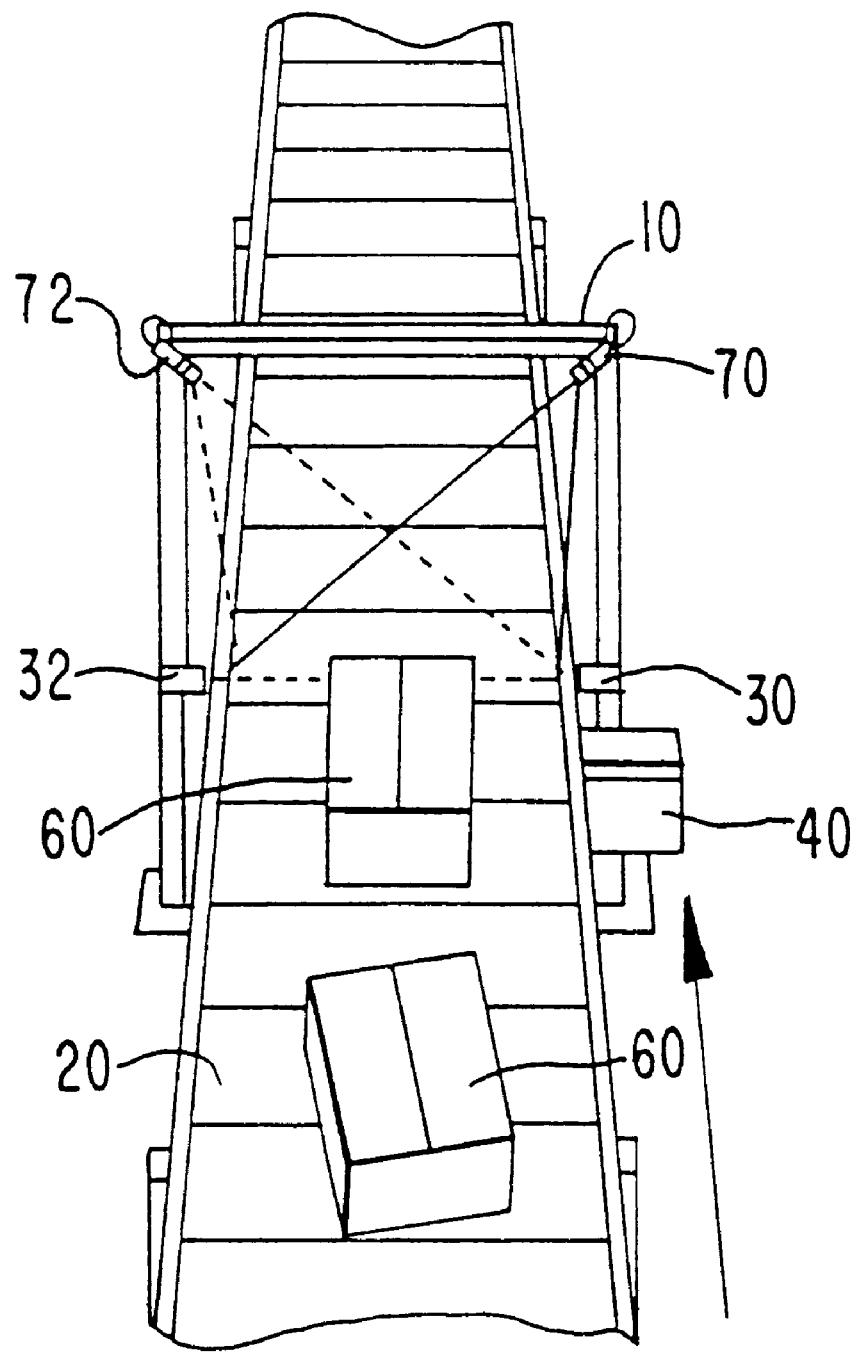
FIG. 2 is a front view of the system according to the invention on a conveyor.

Referring now to FIGS. 1 through 7, the first camera 70 is situated where the first vertical riser 12 and the top bar 16 meet, and a second camera 72 is situated where the second vertical riser 14 and the top bar 16 meet. The first and second cameras 70, 72 are positioned such that the center of their respective coverage zones is the center of the conveyor 20. The first camera 70 picks up light from the first laser light source 30 that reflects off of one side of the objects 60, and the second camera 72 picks up light from the second laser light source 32 that reflects off of an opposite side of the objects 60. Each camera 70, 72 has a field of view which encompasses the entire width of the conveyor 20, as seen in FIG. 2.

FIG. 1 shows a tachometer 80 and a tachometer mounting apparatus 85 disposed on a cross member 90 below the top surface of the conveyor 20. The tachometer 80 is directly connected to the cross member 90, and comprises a mechanical "trundle wheel" 87 of known diameter. This trundle wheel 87 is urged against the belt by tachometer mounting apparatus 85. The tachometer 80 measures the distance travelled of the conveyor 20, simply by counting revolutions (or fractions thereof) of "trundle wheel" 87. In the presently preferred embodiment, the trundle wheel is twelve inches in circumference, and hence each full revolution of the wheel indicates another foot of linear travel by the conveyor 20.

The system 2 has the ability to continue to track the object 60 on the conveyor 20 by "dead reckoning", using the conveyor linear distance travelled, as measured by the tachometer 80, may be used for tracking the object 60 as it traverses along the conveyor 20. When the object 60 reaches a configured transmission location, a serial message is sent to a host computer housed in the electronics 40. The serial message contains the dimensions and computed volume of the object 60, which can be used for further processing of the object 60; e.g., sortation via volume, weight, height, length or a combination thereof.

Figure 8:
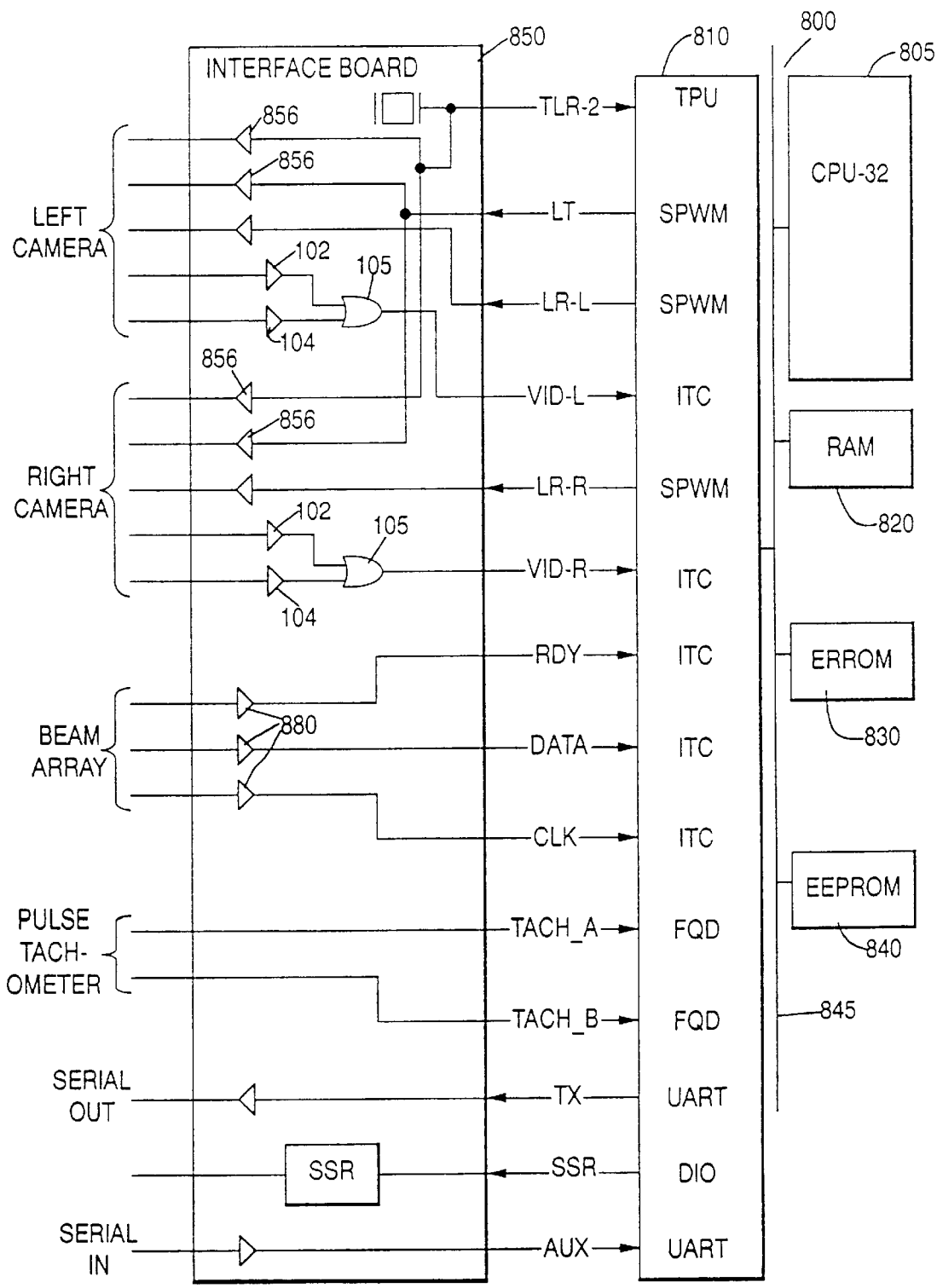
FIG. 8 is a block diagram of the digital computer, TPU and interface board used in the system according to the invention.

A block diagram of the digital computer (or processor) 800 used in the system according to the invention is shown in FIG. 8. In the preferred embodiment, the processor (host computer) 800 is a Motorola 68332 microprocessor, with a CPU-32 core 805 and a Time Processing Unit (TPU) on-chip 810. Such a computer is described in detail in "Motorola Semiconductor Technical Data Manual MC68332" (Motorola, 1993), incorporated herein by reference.

The processor 800 is complemented by an off-chip Random Access Memory (RAM) 820, an Erasable Programmable Read-Only Memory (EPROM) 830, and an Erasable Programmable Read-Only Memory (EEPROM) 840. In the preferred embodiment, the Vesta Technology Inc. SBC-332 card is used, which contains the processor 800, the RAM bar co820, and the EPROM 830. The computing and memory elements are interconnected by address/data buses indicated at 845 on FIG. 8.

The signal levels from the TPU 810 are all Transistor Type Logic (TTL) levels (0 to 5 volts DC), but of course other logic levels (e.g., CMOS or ECL) may be used without departing from the scope of the invention. Most of the sensors used in the system according the invention operate at other voltage levels, so an Interface Board (IB) 850 is used to hold the level translators needed to bring all of the levels to a compatible TTL level.

The TPU 810 allows rapid servicing of the sensor signals without intervention by the processor 800. The TPU 810 allows up to 16 channels, each of which can be configured to run a different micro-coded function. The TPU is described in detail in "TPU Time Processor Unit Reference Manual" (Motorola, 1993), and in "Using the TPU Function Library and TPU Emulation Model" (Motorola Semiconductor Programming Note TPUPN00/D, dated 1993) incorporated herein by reference. In the system according to the invention, the following TPU functions are utilized:

1) SPWM—Synchronized Pulse Width Modulation. Each SPWM channel generates a pulse stream with a settable period and duty cycle. Several channels can be linked together to synchronize the phase between different channels. In the system according to the invention, these channels are used to generate the operating signals for the cameras used in the laser triangulation rangefinders. Four of the sixteen available TPU channels are configured as SPWM channels in the system according to the invention. The SPWM mode is described in detail in "Synchronized Pulse-Width Modulation TPU Function (SPWM)" (Motorola Semiconductor Programming Note TPUPN19/D, dated 1993) incorporated herein by reference.

2) ITC—Input Transition Capture. This TPU function counts input transitions and can generate interrupts after n pulses. In the system according to the invention, these channels are used to capture the discriminated video output of the camera and to count the beam array pulses. Five of the sixteen available TPU channels are configured as ITC channels in the system according to the invention. The ITC mode is described in detail in "Input Capture/Input Transition Counter TPU Function (ITC)" (Motorola Semiconductor Programming Note TPUPN16/D, dated 1993) incorporated herein by reference.

3) FQD—Fast Quadrature Decode. For this TPU function, two FQD channels can be linked together to perform full quadrature signal decoding. In the system according to the invention, these channels are used to read signals from the pulse tachometer. Two of the sixteen available TPU channels are configured as FQD in the system according to the invention. The FQD mode is described in detail in "Fast Quadrature Decode TPU Function (FQD)" (Motorola Semiconductor Programming Note TPUPN02/D, dated 1993) incorporated herein by reference.

4) DIO—Digital Input/Output. This TPU function allows level setting and testing. In the system according to the invention, one of the sixteen available TPU channels is configured as a DIO channel, and it is used to fire a general purpose annunciation relay (SSR), as seen in FIG. 8. The DIO mode is described in detail in "Discrete Input/Output TPU Function (DIO)" (Motorola Semiconductor Programming Note TPUPN18/D, dated 1993) incorporated herein by reference.

5) UART—Universal Asynchronous Receiver/ Transmitter. For this TPU function, each channel can be configured to send or receive serial coded data information. In the system according to the invention, two of the sixteen available TPU channels are configured as UART channels. One of the UART channels is used to transmit the raw dimensional data of the object being measured to host computer 800, and the second of the UART channels is used to output the computed (by the host computer 800) measurement data of the object to an external source, such as a display (not shown in the figures). The UART mode is described in detail in "Asynchronous Serial Interface TPU Function (UART)" (Motorola Semiconductor Programming Note TPUPN07/D, dated 1993) incorporated herein by reference.

Figure 3:
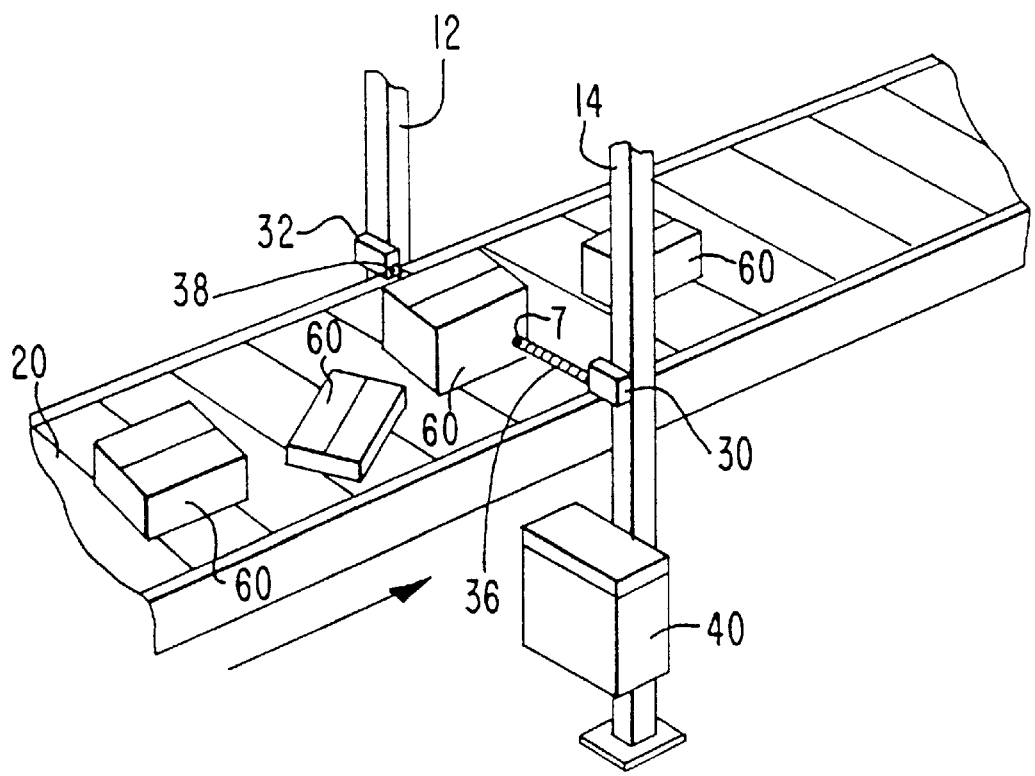
FIG. 3 is a front angle view showing the placement of the laser rangefinders used in the triangulation function for determining the size of an object according to the invention.

As stated earlier, the sides of the objects 60 on the conveyor 20 are measured using laser triangulation rangefinders. (Since the rangefinders are a known, fixed distance apart, subtracting the range from each rangefinder from this known, fixed distance is seen to easily yield the desired dimension information.) Of course, other types of optical triangulation rangefinders may alternatively be used, but laser rangefinders tend to yield more rapid, precise measurement readings. In the preferred embodiment, each side of an object 60 is measured independently with an associated laser source 30, 32 and a CCD camera 70, 72 configured to detect light shined onto the object 60 by the associated laser source, and thereby determine the distance of the object 60 from an edge of the conveyor 20. Thus, each of the two rangefinders is used to measure a side of the object 60 (facing the respective rangefinder) independently of the other rangefinder. The corresponding light beams 36, 38 output from the light sources 30, 32 are shown in FIG. 3.

Figure 4:
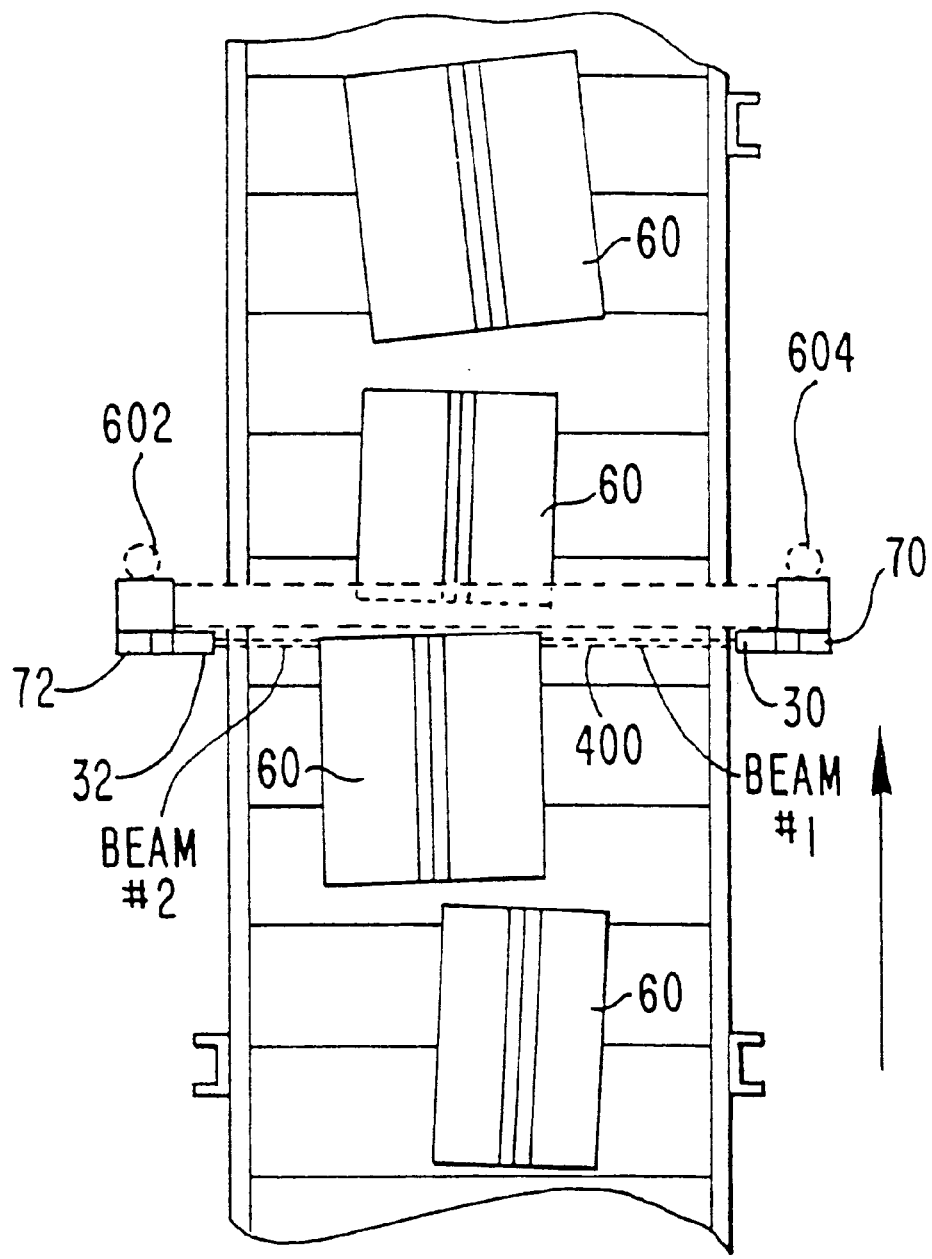
FIG. 4 gives a top view of the system according to the invention on a conveyor.

On each side of the conveyor 20, light output from a laser source defines a line in the measurement plane. The measurement plane 400 of the triangulation rangefinders can readily seen from the top view of the system, as seen in FIG. 4. The measurement plane 400 is horizontally positioned and perpendicular to the direction of travel of the object 60. The intersection in the measurement plane 400 of the triangulation rangefinder of the light output from the light source and the side of the carton facing the light source creates a bright spot of light 7 on the object, as seen in FIG. 5.

In the preferred embodiment, this spot of light 7 is shined on the object 60 about 1" above the surface of the conveyor 20. In this way, small-height objects on the conveyor 20 can be illuminated by the laser light source 30, 32. If the spot of light 7 was even located closer to the surface of the conveyor 20, then even smaller objects may be illuminated as they pass across the laser rangefinders, but then reflections of light off the top surface of the conveyor 20 may occur, which would cause inaccurate readings by the respective line scan cameras 70, 72 which receive the reflected light off of the object 60. Therefore, the location of the spot of light 7 about 1" above the top surface of the conveyor 20 is a reasonable compromise between detecting the sides of small-height objects, while maintaining a reasonable distance from the top surface of the conveyor 20 to allow for proper detection of the spot of light 7 by the line scan cameras 70, 72.

Figure 5:
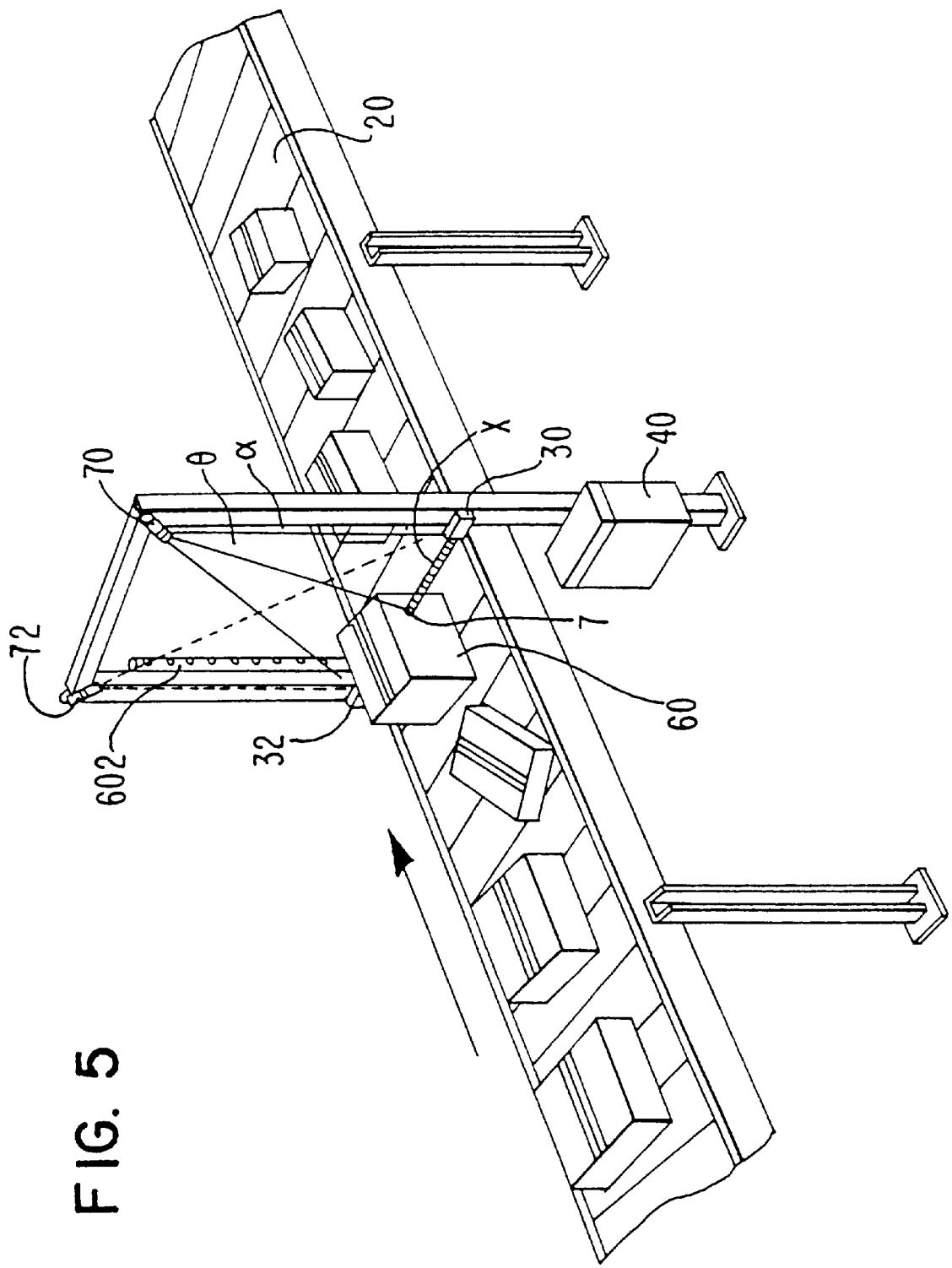
FIG. 5 gives a front angle view of an object on a conveyor traversing the system according to the invention.

The line scan cameras 70, 72 are positioned above the laser sources 30, 32, as seen in FIG. 5. Each of the cameras 70, 72 has an array of many light sensors (not shown in the figures) in a single line in the image plane. Each camera 70, 72 is aimed at the center of the conveyor 20, and the light sensors in each line scan camera 70, 72 are capable of receiving light from any point between the two edges of the conveyor 20. Each camera 70, 72 is aligned so that the illuminated spot 7 on the side of the object 60 is imaged onto the array in the lens of the camera 70, 72.

The discussion below will be given for a laser light source 30 and a camera 70 on one side of the conveyor 20, but it equally holds for the laser light source 32 and the camera 72 on the other side of the conveyor 20.

The distance (a) from the laser light source 30 to the camera 70 is a known value, since the laser light source 30 is fixed in position. There is a non-linear but monotonic relationship between which pixel on the line scan camera 70 is illuminated and the angle θ of the line from the spot 7 to the camera 70 from a vertical plane with respect to the camera 70. Therefore, the range X from the laser light source 30 to the side of the object 60 can be determined by the following equation:

$$X = a * \tan(\theta)$$

FIG. 5 shows the location of each of the values used in the above equation. The relationship between the pixel in the line scan camera 70 illuminated by the laser spot 7 and the angle θ may be derived analytically or may be approximated by an interpolation from a table of calibration measurements. The latter approach is often preferable due to the speed of lookups and interpolation compared to an extensive calculation required by the former approach.

A visible solid state laser 30, 32 with a power level just under 1 milliwatt is used in the preferred embodiment, but of course any amount of laser light that provides an acceptable amount of light that can be shined onto an object and thereby detected by a light detector may be utilized while keeping within the scope of the invention. A line projection laser may be substituted, for example, with the projected laser line set in a horizontal direction. The line projection laser is advantageous in that it is much more tolerant of poor camera alignment.

The line scan camera 70, 72 used in the preferred embodiment is a solid-state charge-coupled device (CCD), and corresponds to the model LC1912, manufactured by EG&G Reticon. Such a camera is described in detail in "LC1912 Series Camera, Operation and Instruction Manual (055-0320-MAN, January, 1993, Revision B), incorporated herein by reference. This camera 70, 72 has 2048 sensors on 13 μmeter centers, and can be clocked at a rate up to 20 MHz.

Figure 9:
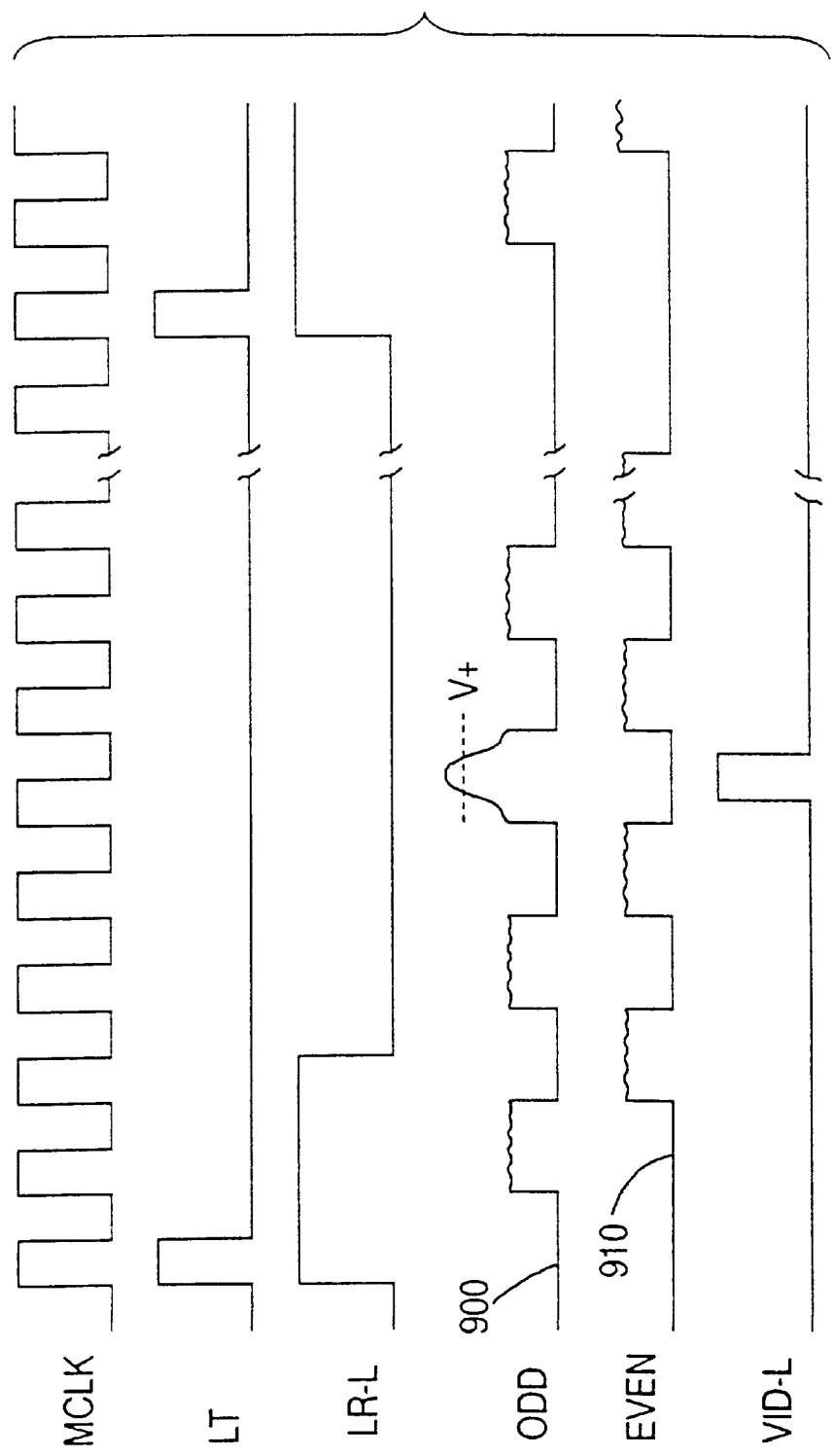
FIG. 9 is a timing diagram illustrating the control of the scan line cameras used in the system according to the invention.

The line scan camera 70, 72 used in the preferred embodiment receives a Master Clock (MCLK) signal and a Line Transfer (LT) signal, as shown in FIG. 9. The master clock is derived from a crystal oscillator which also feeds the TCR2 input to the TPU. The line transfer signals are generated using the SPWM functions of the TPU referenced to TC2. The line scan cameras 70, 72 used in the preferred embodiment requires that these signals be RS-422 level differential signals; and level shifters 856 provided on the Interface Board (IB) in FIG. 8 perform this transformation.

The MCLK signal determines the amount of time that each pixel will be presented at the outputs. The LT signal initiates a transfer of charge from the light sensitive areas of the camera to charge-coupled bucket-brigade devices (i.e., capacitive devices) on either side of the light sensitive areas. These areas are clocked out to an output port, at a rate of one pixel for each MCLK cycle. The MCLK signal and the LT signal, as well as the LR-L and LR-R signal, are respectively output from the host computer 800, through the TPU 810, through the Interface Board (IB) 850, and then to the respective cameras 70, 72 to enable the clocking out of pixel data from the cameras 70, 72.

The Line Reset (LR-L, LR-R) signals allow for electronic shutter control of the respective line scan cameras 70, 72 by throttling the integration time for the cameras 70, 72.

The outputs of each of the two line scan cameras 70, 72 used in the system according to the invention are two separate analog streams, one for the odd pixels (ODD) 900 and one for the even pixels (EVEN) 910. This multiplexing of the respective outputs of the odd and even pixels allows for a faster speed in clocking the pixel data to the outside to more quickly prepare for the next light detection reading.

Analog discriminators 100 (shown in FIGS. 8 and 10) are set by adjusting the trimming potentiometers POT1, POT2 to fire only on those pixels illuminated by the laser spot 7. The output of the discriminator 100 is is called the VID-L signal (for the discriminator 100 used with the left camera 70), and is detected by a TPU channel (see FIG. 8) configured to perform the ITC function described earlier. A separate discriminator is provided for the right camera 72 for generating the VID-R signal As seen in FIG. 9, the photo-detected light from the third odd photo-detector exceeds a predetermined threshold value Vt, which indicates that the spot of light 7 incident on the object 60 has been picked up at a location on the conveyor 20 at which the third odd photo-detector points to.

Figure 10:
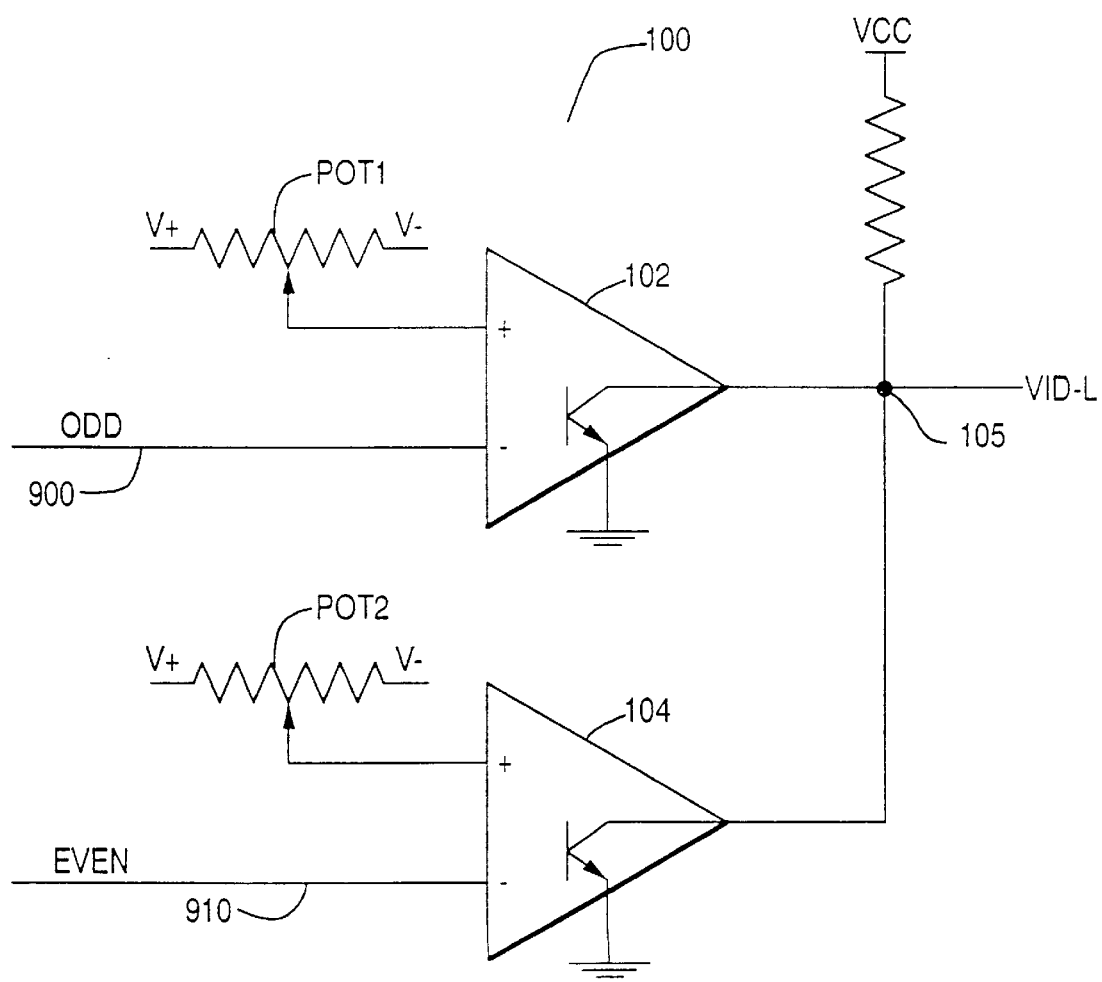
FIG. 10 is a schematic diagram for the rangefinder discriminator used in the system according to the invention.

Referring now to FIG. 10, since the intensity of light detected by the third odd photo-detector is greater than the predetermined threshold level Vt, the VID-L pulse will be generated by comparator 102 (used with the left camera 70) at a time corresponding to when the data is being output by the third odd photodetector. Note that a potentiometer POT1, POT2 is respectively connected to a non-inverting terminal of the odd and even comparators 102, 104 that make up the discriminator 100. With this configuration, the predetermined threshold value Vt can be adjusted based on various factors, such as background light, type of laser light source used, etc. The outputs of the comparators 102, 104 are wired-ORed at position 105 in FIG. 10.

Every time the line transfer (LT) signal fires (i.e., is active "low"), the current count of the MCLK signal is stored in a data buffer. In the preferred embodiment, the LT signal fires at a 1 KHz rate (i.e., 1000 times per second). In the preferred embodiment, data from the first odd photo-detector is clocked out about 13 MCLK cycles after the firing of the LT signal.

When the VID-L signal trips the ITC function, the then-current MCLK count is stored in a data buffer. The difference between these two MCLK counts directly yields the "number" of the illuminated pixel. In FIG. 9, this number is five, and corresponds to the third "odd" pixel.

In the preferred embodiment, the first pixel that receives enough light in order to cause the VID-L signal to be active "high" is determined to be the pixel which is pointed at the precise location on the conveyor where the spot on the object is located. Of course, other procedures may be utilized while keeping within the scope of the invention, such as obtaining a profile of all of the pixels, so that if more than one pixel causes a VID-L signal to be output "high", a weighted midpoint of these illuminated pixels may alternatively be used to estimate the position of the spot of light output from the laser light source.

Figure 6:
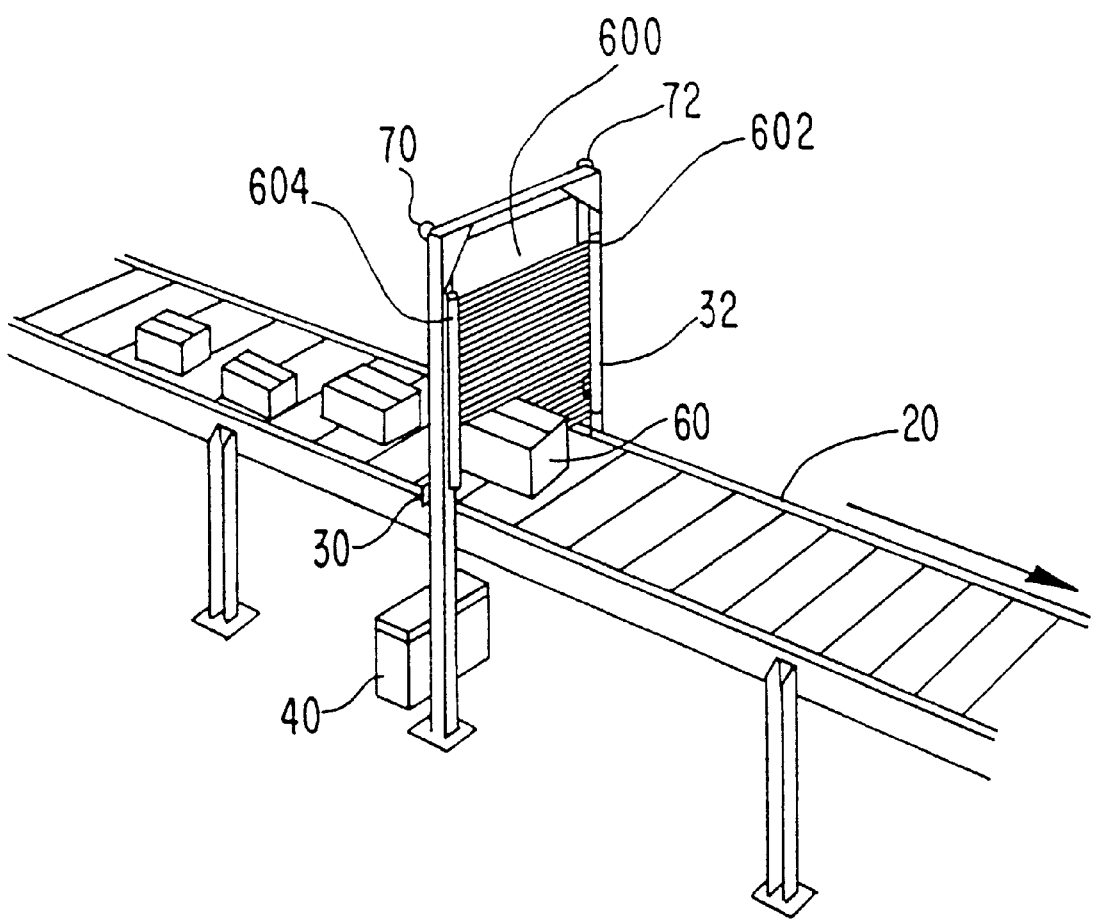
FIG. 6 gives a back angle view of an object on a conveyor traversing the system according to the invention.
Figure 7:
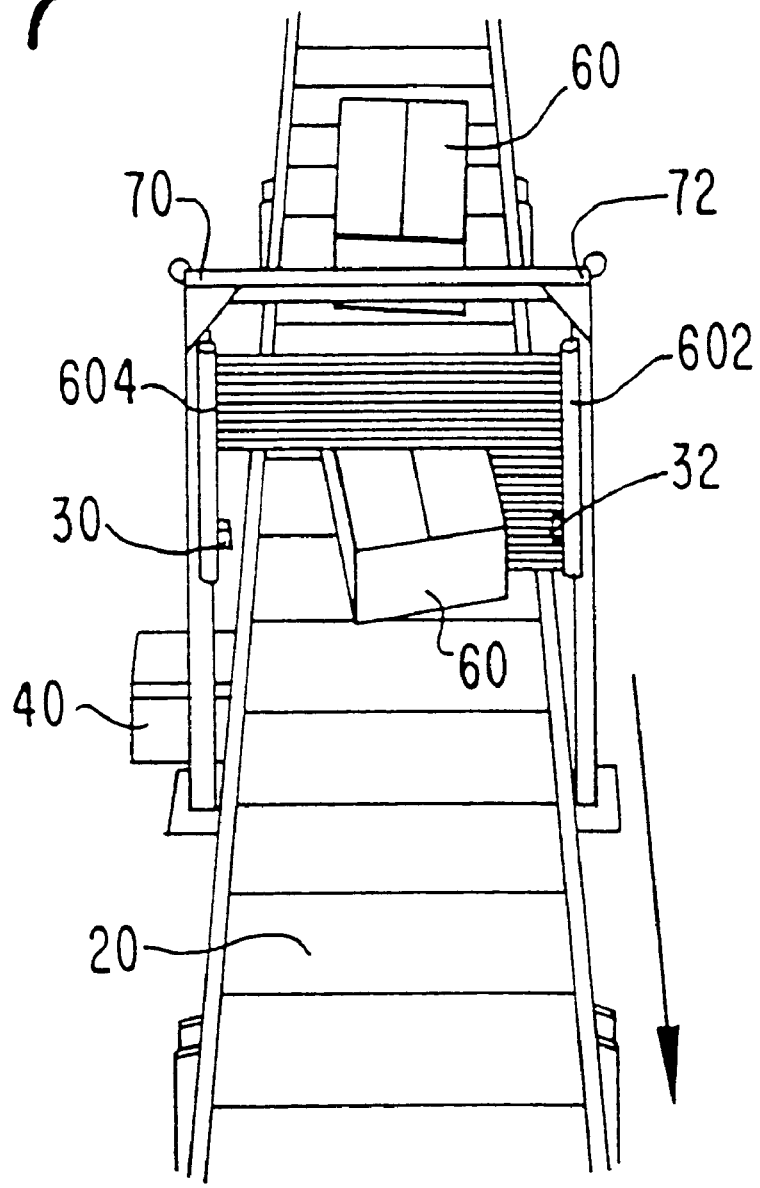
FIG. 7 gives a back view of an object on a conveyor traversing the system according to the invention.

The light curtain used in the system according to the invention measures the highest point of the object 60 as it passes through a perpendicular plane (with respect to the conveyor 20) defined by the light curtain. The light curtain 600 is shown pictorially as multiple horizontal laser light beams between the respective vertical risers in FIG. 6. The light curtain 600 includes two arrays of photodevices: the beam-array emitter 602 and the beam-array receiver 604. The emitter 602 has many photo-transmitters spaced apart at predetermined distances from each other, such as ¼ inch apart. The receiver 604 has just as many photoreceivers configured to receive light from a respective one of the photo-transmitters, and so they are spaced apart at the same predetermined distances as the photo-transmitters. In FIG. 6, each of the multiple horizontal lines of the light curtain 600 corresponds to the location of a light beam from one of the photo-transmitters of the emitter array 602 sent in the direction of a respective one of the photo-receivers of the receiver array 604.

Figure 11:
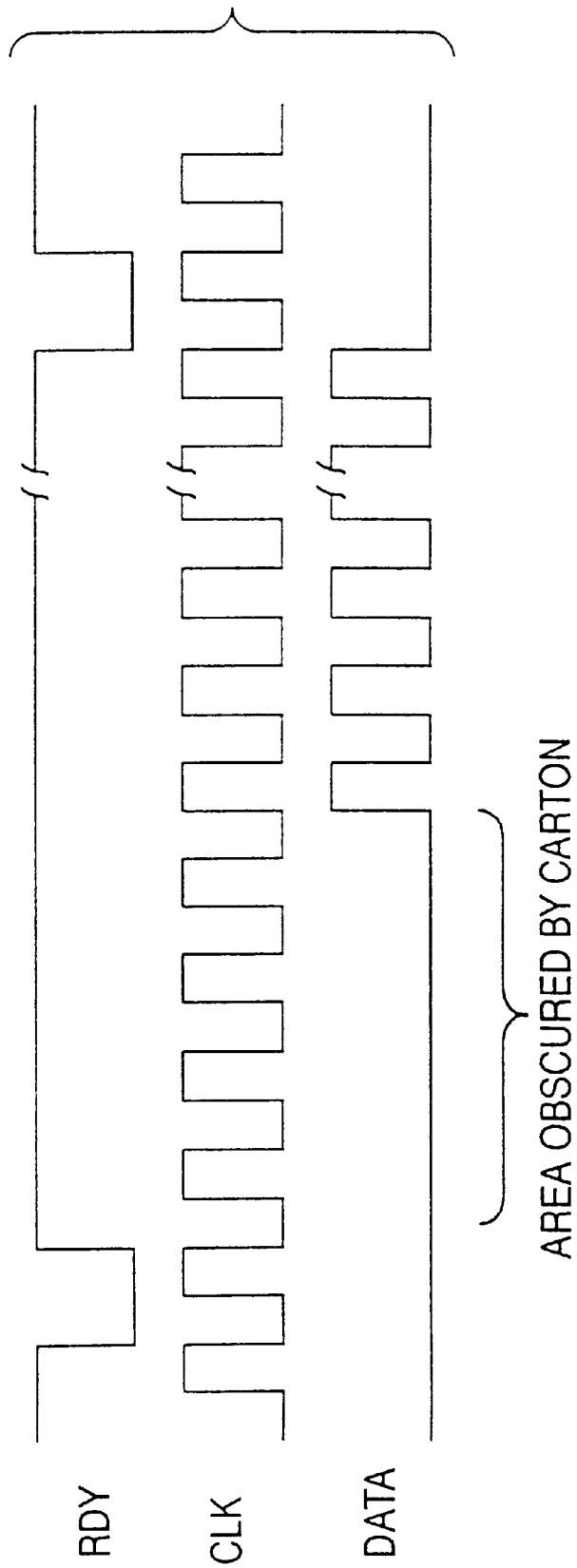
FIG. 11 is a timing diagram for the input signals to the light curtain for determining the height of an object on the conveyor.

In the preferred embodiment, the light curtain 600 is constructed using the BeamArray system, manufactured by Banner Engineering Corp., located in Minneapolis, Minn. Such a system is described in U.S. Pat. No. 5,266,793, for example, incorporated herein by reference. When powered and wired for continuous scanning using the internal clock of the BeamArray system, the beam arrays 602, 604 making up the light curtain 600 generate the signals shown in FIG. 11. The CLK signal cycles each time that an emitter-receiver pair are enabled. The DATA signal cycles each time that the enabled receiver is illuminated by the enabled transmitter (and therefore is not blocked by an object) The RDY signal pulses every time the beam array has scanned to the end of the array and is starting at the beginning again.

These signals are at RS-232 levels for the Banner Engineering light curtain, and are conversed to TTL levels by level shifters 880 shown on the interface board (IB) 850 in FIG. 8.

The RDY signal, the CLK signal and the DATA signal are fed into respective ITC channels on the TPU 810, as shown in FIG. 8. The CLK ITC channel counts the number of emitter-receiver pairs sampled. The DATA ITC channel counts the number of emitter-receiver pairs not blocked by an object passing across the light curtain. The RDY signal generates an interrupt, which stores the difference between the CLK count and the DATA count as the height of the object in units of ¼ inches, and then zeros the two counters for the next height measurement.

Figure 12:
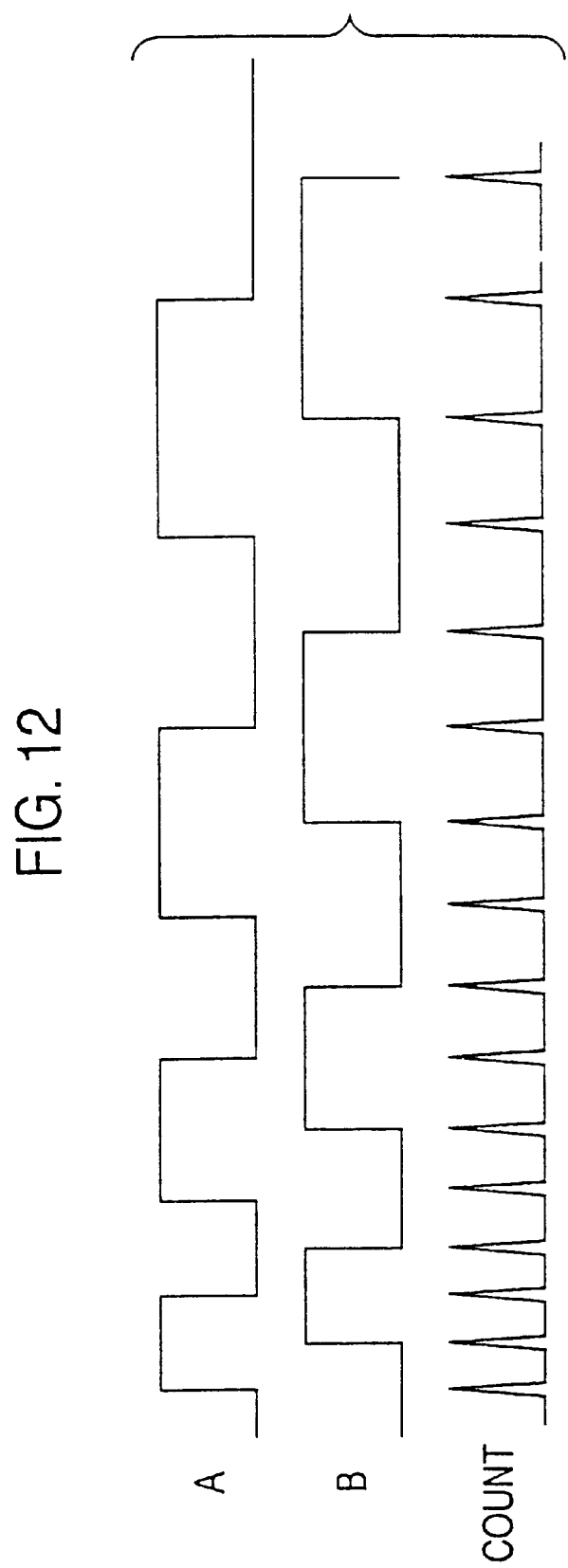
FIG. 12 is a timing diagram for the input signals for the pulse tachometer of the system according to the invention.

The movement of the conveyor 20 is measured by a wheeled pulse tachometer 80 mounted under the conveyor 60 in contact with the return belt of the conveyor 60, as shown in FIG. 1. In the preferred embodiment, the RHQ-360 model, manufactured by Photocraft, Inc., located in Sandwich, Ill., is used as the tachometer. Using a 360-pulse tachometer 80 with 12 inch circumference wheels, each pulse indicates that the conveyor 20 has moved 1/30 inches. FIG. 12 shows the signals utilized by the pulse tachometer 80. A first clock signal A and a second clock signal B correspond to the movement of the wheel of the tachometer 80. The count signal COUNT outputs a pulse for each rising and falling edge of the first and second clock signals A, B. Each pulse of the count signal corresponds to a 1/30 inch movement of the conveyor 60. The A and B clock signals output from the pulse tachometer 80 are fed into two linked TPU channels running the FQD function, as shown in FIG. 8.

The system according to the invention also may be configured to provide a weighing function for objects passing over a particular area of the conveyor. In the preferred embodiment, the apparatus (not shown) for providing such a measurement is a Weigh-Bar system, manufactured by Weigh-Tronix, Inc., located in Armstrong, Iowa. The Weigh-Bar system uses load cells. Such load cells are described in U.S. Pat. Nos. 5,336,854 and 5,313,023, incorporated herein by reference. Of course, other types of weighing apparatuses may be used, and still remain within the scope of the invention.

Further, the system according to the invention is also configured to provide a bar code scanning feature (see element 47 of FIG. 1) as objects pass through a part of the conveyor. In the preferred embodiment, a bar code scanning system known as "SureScan" which is manufactured by the LazerData Products Group of PSC Inc., of Webster, N.Y. is used to provide such a scanning of moving objects on a conveyor. The SureScan scanning system is provided along one or both sides of the conveyor, and can be placed close to the light curtain and/or laser light source. The LazerData bar code scanning device is described in the SureScan Omnidirectional Reading System is described in detail in its May, 1994 manual which is available from LazerData and which is incorporated herein by reference. Of course, other types and makes of scanning apparatuses may be used to scan bar codes off of moving objects, and still remain within the scope of the invention.

Figure 13:
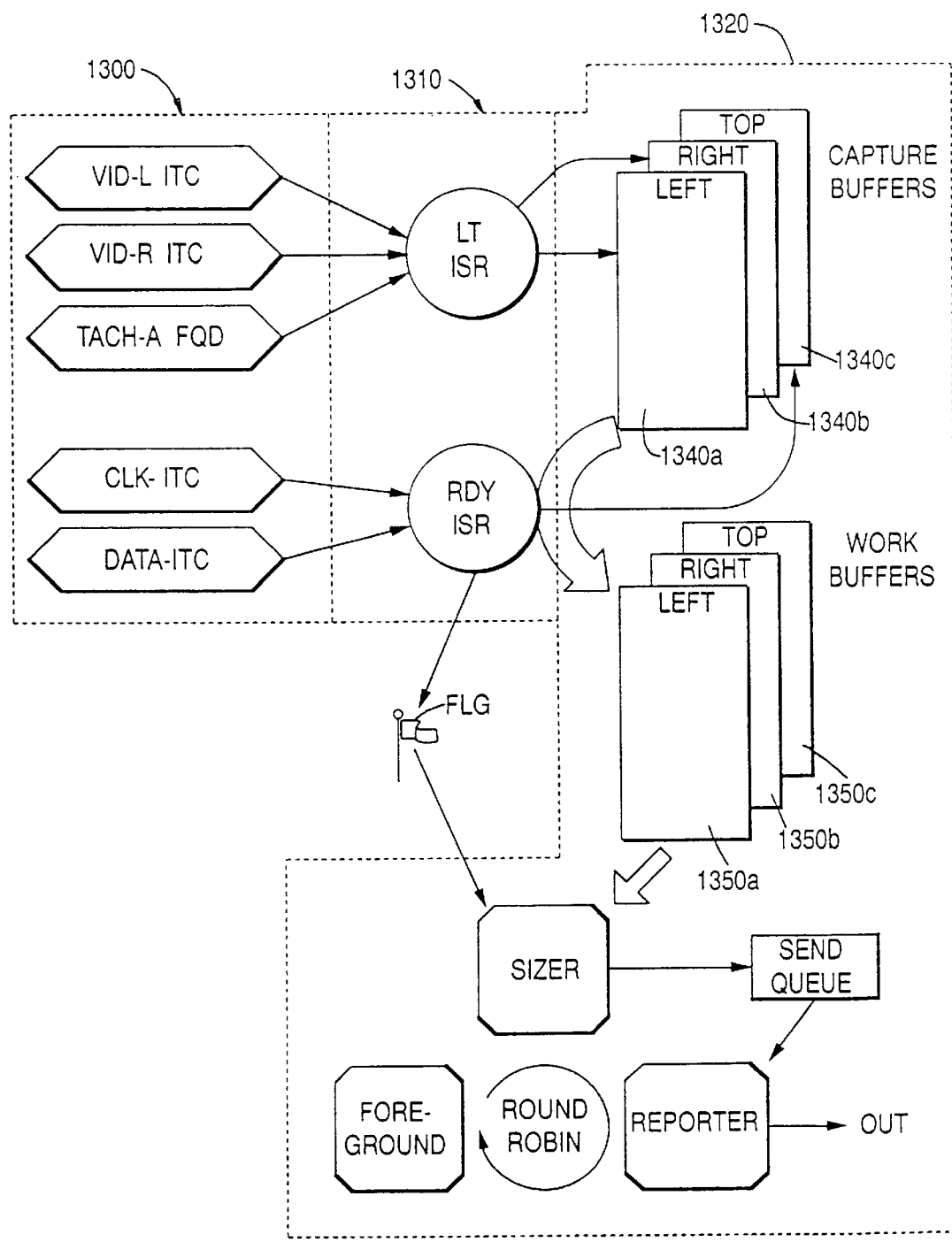
FIG. 13 is a high-level block diagram detailing the structure of the software modules used in the system according to the invention.

The overall scheme for data acquisition and data flow in the system according to the invention is shown in FIG. 13. In FIG. 13, there are three levels of processing that take place in order to gather, tabulate and interpret data to obtain the dimensions of the objects on the conveyor.

The first level is the microcode level 1300. The lowest levels of data acquisition are performed by microcoded TPU functions without the intervention of the CPU. These functions are shown in the upper left hand portion of FIG. 13.

The second level is the interrupt service routine level 1310. Each time that a camera or beam array completes a scan of all of the sensors, an interrupt service routine inserts the data into capture buffers 1340*a*, 1340*b*, 1340*c*. The data from the capture buffers 1340*a*, 1340*b*, 1340*c* is then used by the CPU to perform the required measurement computations. The interrupt service routines LT-ISR and RDY-ISR are shown in the top center portion of FIG. 13. The capture buffers 1340*a*, 1340*b*, 1340*c* are shown on the top right hand portion of FIG. 13.

The third level is the task level 1320. The operator interface, dimension calculations, and message transmission are performed by tasks that are controlled by a cooperative round-robin multitasker. These tasks are shown in the bottom portion of FIG. 13.

The fundamental task of the two lowest levels of processing is to build three profiles of each object: the top, the left side and the right side. As each object passes through the light curtain and laser range finder and triangulation circuit, the interrupt service routine LT-ISR inserts values for the left and right sides of the object into a respective left and right side capture buffer 1340*a*, 1340*b*, and the interrupt service routine RDY-ISR inserts values for the top of the object into a top side capture buffer 1340*c*. Thus, three arrays of values corresponding to the left-side, right-side and top of the object 60 are stored in their respective capture buffers 1340*a*, 1340*b*, 1340*c*. Each measurement in the arrays contains the raw size measurement and the tachometer count at the time the measurement was taken.

The RDY-ISR interrupt service routine also detects the trailing edge of the object leaving the array. When this trailing edge detection occurs, the RDY-ISR interrupt service routine copies the three object profiles from the capture buffers 1340*a*, 1340*b*, 1340*c* to the work buffers 1350*a*, 1350*b*, 1350*c*. By this pipelined arrangement, the raw measurements of one object can be processed while the raw measurement data for the next object on the conveyor can be collected at the same time. The work buffers 1350*a*, 1350*b*, 1350*c* allow for double buffering, so that data can be taken for the next object on the conveyor (into the capture buffers 1340*a*, 1340*b*, 1340*c*) while processing of the previous object is being done by the host computer from the data scored in the work buffers 1350*a*, 1350*b*, 1350*c*.

The RDY-ISR interrupt service routine also sets a flag FLG to indicate the arrival of new data to the SIZER task; i.e., data arriving from the work buffers 1350*a*, 1350*b*, 1350*c*. The SIZER task performs the data evaluation, and queues the results into a SEND queue. In the preferred embodiment, when the object has completely moved past the light curtain array, then each of the photodetector receivers will receive light from their respective photodetector transmitters on the opposite side of the conveyor. This occurrence will trigger the flag FLG being set by the RDY-ISR interrupt service routine, to inform the host computer that the current object is slightly downstream from the light curtain array. The setting of the flag FLG also allows the data in the capture buffers 1340*a*, 1340*b*, 1340*c* to be transferred to the respective work buffers 1350*a*, 1350*b*, 1350*c* for processing by the host computer, since no more raw measurement data from the current object is forthcoming.

The REPORTER task monitors the queue and transmits the message to the host computer when the tracking of the object on the conveyor indicates that the object has reached the designated transmit point. The point at which the object arrives at the designated transmit point can be determined by dead reckoning, in a manner similar to that previously described.

The SIZER tasks performs the data evaluation function, and it evaluates the dimension of an object from the data deposited into the work buffers by the lower levels of processing. It does so by performing the following steps.

Figure 14A:
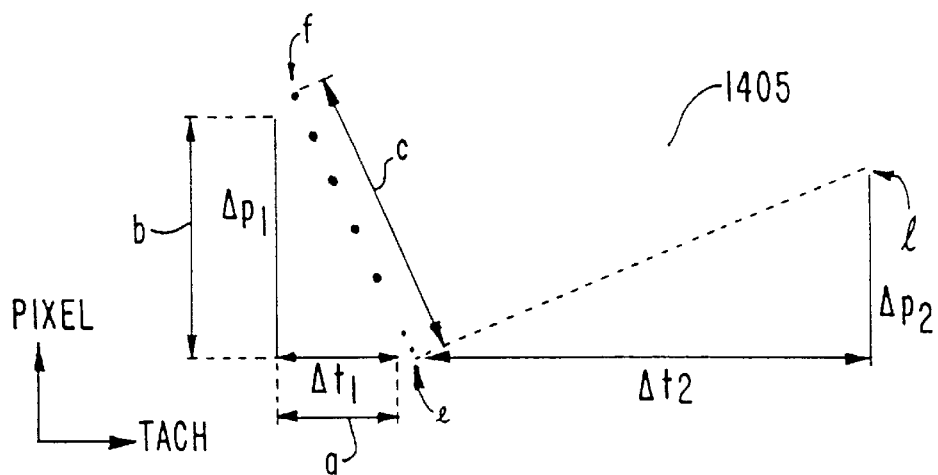
FIG. 14a gives a profile of the detection of the spot of light on an object over a period of time by the laser range finder triangulation system.

1.) Since cartons can be "skewed" (i.e., such that she carton sides are not parallel with respect to the belt edge), it is possible to collect measurements from two sides of the object. A typical array, plotted with the tachometer value (i.e, time) as the abscissa and the pixel number as the ordinate, is shown as the array of points 1405 in FIG. 14*a*. The SIZER task first selects the side of the object and eliminates the ends. This is done by the following procedure.

a) Identifying the cardinal points, which correspond to the first point (f), the last point (l) an the extreme closest point (e). These points are identified respectively by pixel-tachometer pairs $(p_f, t_f)$, $(p_l, t_l)$, and $(p_e, t_e)$ b) Estimating the two slopes $m_1$ and $m_2$ using the following equation:

$m_1 = \Delta p_1 / \Delta t_1$, and $m_2 = \Delta p_2 / \Delta t_2$, where $\Delta p_1 = p_f - p_e$, $\Delta t_1 = t_f - t_e$, $\Delta p_2 = p_l - p_e$, and $\Delta t_2 = t_l - t_e$.

c) If $|m_1| > |m_2|$, then the points from point e to point l are used as defining the side of the object. Otherwise, the points from point f to point e are used as defining the side of the object.

Figure 14B:
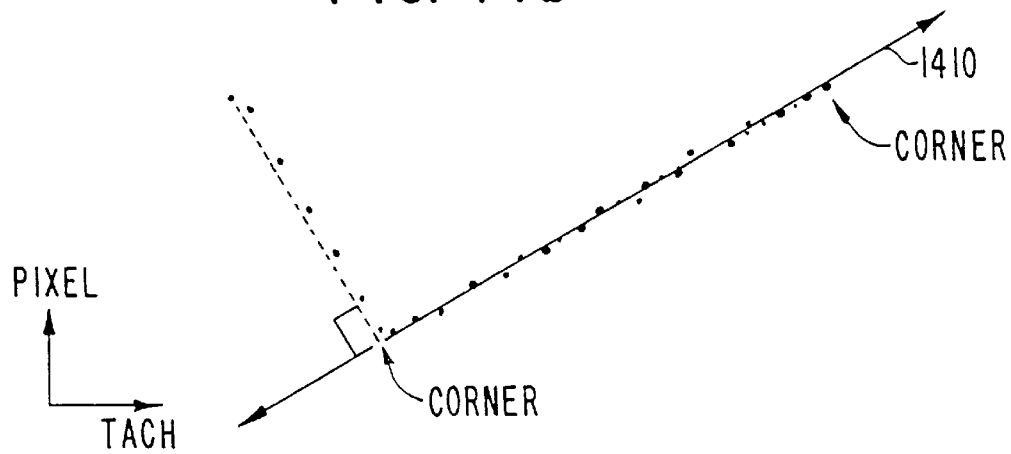
FIG. 14b shows the same profile of FIG. 14a, with a line corresponding to one side of the object computed as a linear least squares fit of a subset of points in the profile.
Figure 15A:
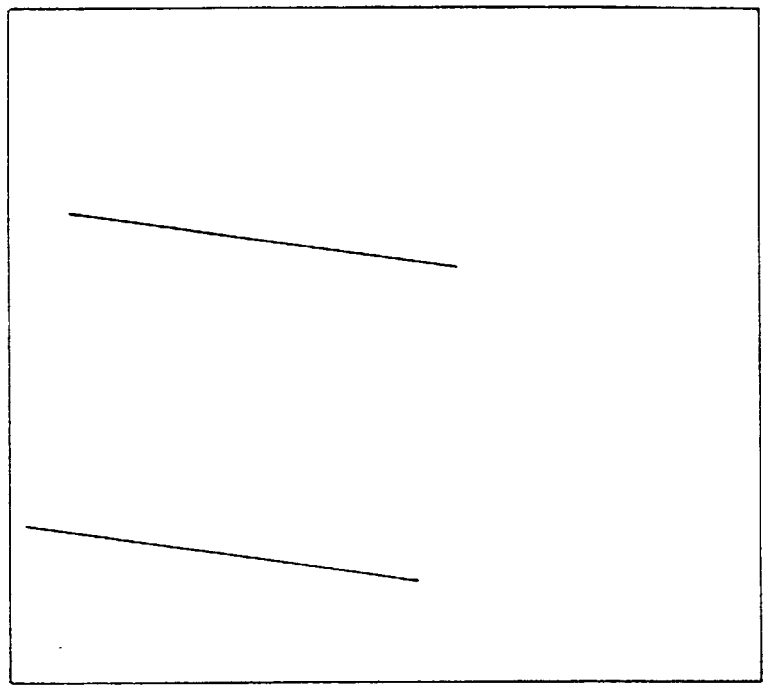
FIGS. 15a–15d are plots of the arrays of data which are used to compute carton measurements.
Figure 15B:
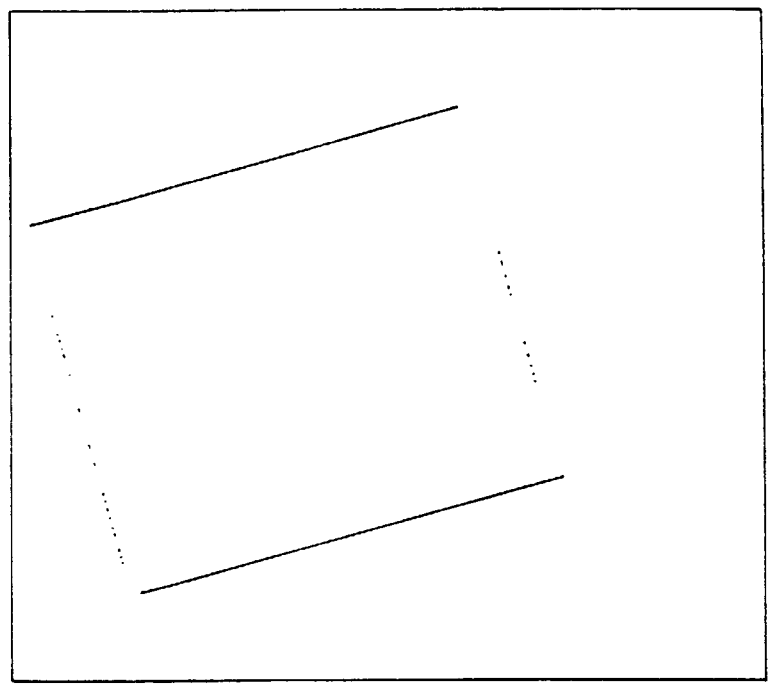
Figure 15C:
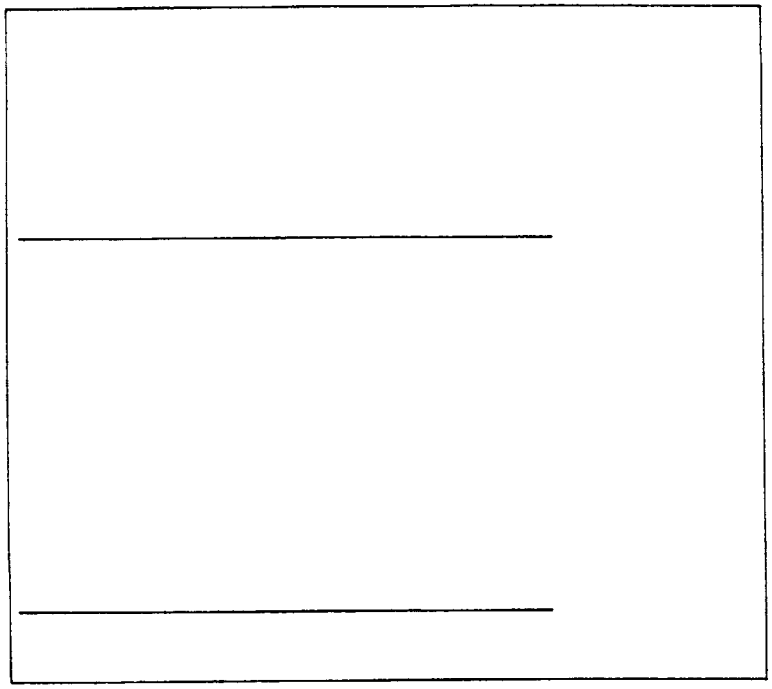
Figure 15D:
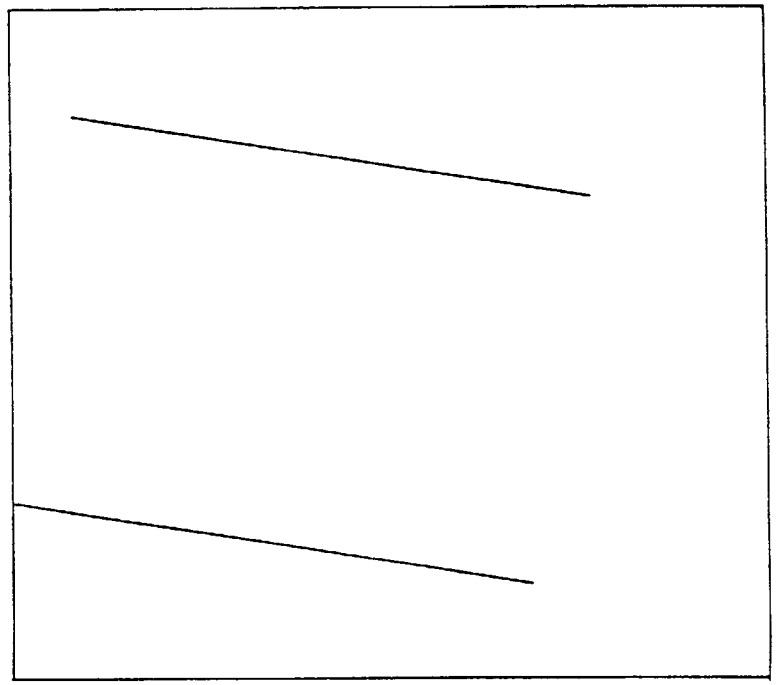

2.) Once the side is determined, a subset of points is selected. In the preferred embodiment, 10 evenly spaced points are selected between and including the endpoints. The raw values are converted to calibrated values, and a slope m and intercept b are estimated using an equal-weight linear least-squares approach. Such a line 1410 determined by a linear least-squares approach is shown in FIG. 14*b*. By this step, a line defining the side of the object is determined.

3.) The end cardinal points are perpendicularly projected to the linear least-squares fit line. The point at which the intersection occurs is determined to be an edge of the object. Of course, while in the preferred embodiment, only the end cardinal point (i.e., point f or point l) is used to project a line to the least-squares fit line 1410, a second linear least-squares fit line could also be obtained for the other (adjacent) side of the object. Then, the intersection of the linear least-squares fit line 1410 defining a side of the object and the second linear least-squares fit line defining the other (adjacent) side of the object would define an edge of the object. Alternatively, a single laser camera pair may be used to identify three corners, which is sufficient for rectangular solid objects, to determine the volume of the object.

4.) Once the locations (xi, yi) of the four vertical edges are determined, the carton dimensions can be estimated by computing the distance between adjacent edges using the distance formula:

$$d = SQRT\{(x1-x2)^2 + (y1-y2)^2\}$$

The length is estimated by computing the distance between edges on the same side of the carton. The width is estimated by computing the distance between edges on the same end of the carton.

As two estimates for each dimension are produced by the left and the right laser range finder systems, the largest value is chosen, since most measurement errors will underestimate the dimensions of an object being measured. Again, other appropriate techniques may be alternatively utilized, such as using the respective averages of the left side and the right side length and width estimates as the determined size of the object.

5.) With the exception of the leading and trailing edges of the object being measured, all of the top measurements should be commensurate, assuming that the objects on the conveyor are relatively rectangular solids in shape. Consequently, after discarding the first few and last few height measurements to avoid edge effects, the height is estimated by averaging all of the top measurements.

Therefore, with the above approach, a length, width and height measurement of objects on a conveyor can be readily determined, no matter the speed of the conveyor or the spacings between objects on the conveyor. If objects happen to overlap on the conveyor, the system according to the invention will treat the combined shape of the overlapped objects as one object for purposes of measurement.

Unlike conventional systems, since the length and width measurements are not computed by a laser light curtain or similar device, the conveyor can be a unitary device, and there is no need to have a break in the surface of the conveyor in order to place photo-transmitters or photo-receivers in their proper place.

In the system according to the invention, if an object is perfectly perpendicular with respect to the left and right side light beams emitted from the respective left side and right side laser light sources, the algorithm as described above is slightly modified since each of the points measured in the step a) correspond to the extreme closest point e to the conveyor; i.e., all points including points f, e, and l on the same straight line. In this instance, one side of the object is determined as the distance between the first point f and the last point l. It is not known if this distance corresponds to the length or width of the object at this time. For ease of description, this side will be identified as side one. The dimensions of side one and its opposite side are determined in the same manner.

A linear least-squares fit is computed for all of the points, and a point on the linear least-squares fit closest to the first point f is determined to be one edge for side one of the object, and a point on the linear least-squares curve closet to the last point l is determined to be the other edge of side one of the object. As a result of this computation finding the corners of the object, the dimensions of the object can readily be determined, using step 4), described above.

If a single laser/camera pair is used, it is possible to determine three corners of the object only if the object is skewed along the direction of the conveyor, i.e., not oriented with its sides parallel to the direction of travel along the conveyor. Thus, using a single laser/camera pair is sufficient to measure the volume of all skewed objects on the conveyor. Objects may be intentionally skewed on the conveyor to permit use of a single laser/camera pair for the length/width measurements.

FIGS. 15a through 15d illustrate captured profiles of objects on a conveyor using the steps 1) through 5), given above. As readily seen from FIGS. 15a through 15d, once the lengths of the object are computed, the widths of the object can be determined by forming a line between the endpoints on each side of the computed lengths of the object.

While a preferred embodiment of the invention has been described herein, it will become apparent to those of ordinary skill in the art that modifications to the above-described invention may be performed while still keeping within the teachings of the invention. For example, other types of light detection cameras instead of a CCD camera may be utilized. Further, the system could operate at a non-visible frequency, such as an infrared wave band or an ultraviolet wave band, so that the (ultraviolet or infrared) light source and the camera would be configured to respectively output an electromagnetic wave at the required wavelength.

What is claimed is:

1. An apparatus for determining a location of an object relative to a side of a conveyor on which said object is travelling, comprising:

a light source configured to output a light beam along a path from said side of said conveyor towards said object;

a CCD camera located above said conveyor and configured to receive light from said light beam reflected off said object, said CCD camera including a plurality of light detecting elements for performing an electronic scan to determine a location at which said light beam impinges a first side of said object; and a processor configured to receive outputs from said plurality of light detecting elements and to determine said location of said first side of said object relative to said side of said conveyor, wherein said CCD camera is fixed in position and orientation with respect to said conveyor during said electronic scan of said CCD camera.

2. The apparatus according to claim 1, wherein said CCD camera is positioned on a housing connected to said conveyor, said housing having a first portion extending upwardly from said side of said conveyor.

3. The apparatus according to claim 1, wherein said CCD camera is positioned on a housing adjacent said side of said conveyor, said housing having a first portion extending upwardly with respect to said side of said conveyor.

4. The apparatus according to claim 2, further comprising:

a second light source configured to output a light beam along a path from another side of said conveyor towards said object, said another side of said conveyor being opposite said side of said conveyor; and a second CCD camera located above said conveyor and configured to receive light off of said object due to said light beam impinging said object from said second light source, said second CCD camera including a plurality of light detecting elements for performing an electronic scan to determine a location at which said light beam output from said second light source impinges a second side of said object, wherein said second CCD camera is fixed in position and orientation with respect to said conveyor during said electronic scan of said second CCD camera, wherein said processor is configured to receive outputs of said plurality of light detecting elements of said second CCD camera and to determine said location of said object relative to said another side of said conveyor.

5. The apparatus according to claim 1, wherein said light source is a laser light source.

6. The apparatus according to claim 5, wherein said light source is fixed in position and orientation with respect to said conveyor when said light source outputs said light beam.

7. The apparatus according to claim 4, wherein said second CCD camera is positioned on another housing connected to said conveyor, said another housing having a first portion extending upwardly from said another side of said conveyor.

8. The apparatus according to claim 4, wherein said second CCD camera is positioned on another housing adjacent said another side of said conveyor, said another housing having a first portion extending upwardly with respect to said another side of said conveyor.

9. The apparatus according to claim 4, wherein said CCD camera is positioned on said housing, wherein said housing has a second portion extending upwardly with respect to said another side of said conveyor, and wherein said housing has a third portion connected on one side to said first portion and connected on another side to said second portion, said third portion being in a substantially parallel relationship with respect to said conveyor.

10. An apparatus for determining a size of an object on a conveyor, comprising:

a light source configured to output a light beam towards said object;

a CCD camera located above said conveyor and configured to receive light from said light beam reflected off said object, said CCD camera including a plurality of light detecting elements for performing an electronic scan to determine a location at which said light beam impinges said object;

a measuring circuit configured to determine one of a current speed of said conveyor and a distance traveled by said conveyor, said measuring circuit configured to output a measuring signal indicative thereof;

a height measuring circuit configured to determine a height of said object and to output a height signal indicative thereof; and a processor configured to receive said measuring signal, said height signal, and outputs from said plurality of light detecting elements for at least a time period corresponding to a first time when said light beam is initially incident on said object up to a second time when said light beam is finally incident on said object, said processor configured to determine an array of locations of said object and to determine a length of a first side of said object based on said array of locations and said measuring signal, wherein said CCD camera is fixed in position and orientation with respect to said conveyor during said electronic scan of said CCD camera, and wherein said processor is configured to determine said size of said object based on said length of said first side of said object and a height of said object as determined from said height signal.

11. The apparatus according to claim 10, wherein said length of said first side of said object is determined by: i) identifying a first point of said array of locations at which said light beam was initially incident on said object, ii) identifying a second point of said array of locations at which said light beam was finally incident on said object, and iii) identifying a third point in said array of locations corresponding to a minimum distance, wherein, if said third point does not correspond to either said first or second points, then said array of locations corresponds to said first side of said object and at least one more side of said object, and wherein said length of said first side of said object is determined from a portion of said array of locations corresponding to points between said first point and said third point of said array of locations, inclusive.

* * * * *